(12) United States Patent
Zhu et al.

(10) Patent No.: US 7,108,558 B2
(45) Date of Patent: Sep. 19, 2006

(54) CARD CONNECTOR

(75) Inventors: ZiQiang Zhu, Kunsan (CN); JinKui Hu, Kunsan (CN); GuoHua Zhang, Kunsan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/117,259

(22) Filed: Apr. 27, 2005

(65) Prior Publication Data

US 2006/0025019 A1 Feb. 2, 2006

(30) Foreign Application Priority Data

Jul. 28, 2004 (CN) .................. 2004 2 00782547

(51) Int. Cl.
*H01R 24/00* (2006.01)
(52) U.S. Cl. ..................................... 439/630
(58) Field of Classification Search ............... 439/630, 439/138, 142, 159, 188, 260
See application file for complete search history.

(56) References Cited

U.S. PATENT DOCUMENTS

| 6,666,724 | B1 | 12/2003 | Lwee |
| 6,672,904 | B1 * | 1/2004 | Chen ........................... 439/631 |
| 6,783,399 | B1 * | 8/2004 | Joung ........................... 439/630 |
| 6,908,321 | B1 * | 6/2005 | Lai .............................. 439/140 |

* cited by examiner

*Primary Examiner*—Alexander Gilman
(74) *Attorney, Agent, or Firm*—Wei Te Chung

(57) ABSTRACT

A card connector includes an insulating housing defining at least two adjacent card cavities; a number of card contacts are retained in the housing and divided into at least two groups to expose to corresponding card cavities; and at least one controlling member is disposed on the housing between the two card cavities, and a stopper is deflected between the two car cavities and protruding into one card cavity once a card inserted into the other car cavity, and a resilient portion is for urging the stopper to resume its original position once the card withdrew from the other cavity.

20 Claims, 15 Drawing Sheets

CARD CONNECTOR

BACKGROUND OF THE INVENTION

1. Field of the Invention

The present invention relates to a card connector, especially to a card connector which is adapted for insertion of cards of different types and can only loads one card one time.

2. Description of Related Art

With development of electrical appliances such as portable telephones, telephones, PDA (personal digital assistance), portable audio, cameras and the like, a lot of different kinds of cards such as a SD (super density, secure digital) card, a CF (compact flash) card, a SM (smart media) card, a MS (memory stick) and an XD (xd-picture) card are widely used in the field of the electronics. Thus a lot of different card connectors are needed loading different cards. However, if one card connector only load one corresponding card, more cards are needed more card connectors to load, thus occupying a lot of areas of the electrical appliances and interfering with downsizing of the electrical appliances. Thus a card connector which can load some different cards simultaneously is required.

At present, a card connector which can load some different cards simultaneously has a plurality of inserting cavities for receiving different cards, that is to say, when the card connector loads a card such as CF card, it can load else card or cards simultaneously. Though the card connector can load different cards simultaneously, it inspects and recognizes one card one time. In order to inspect and recognize all the cards when the card connector load different cards at the same time, it is needed to design corresponding softwares and add corresponding inspecting contacts to expand functions of the card connector, thus certainly encountering a lot of difficulties in designing and manufacturing.

Hence, an improved card connector is required to overcome the disadvantages of the prior art.

SUMMARY OF THE INVENTION

An object of the present invention is to provide a card connector which is adapted for insertion of five different kinds of cards and only loads one card one time.

Accordingly, to achieve above-mentioned object, a card connector comprises an insulating housing defining at least two adjacent card cavities; a plurality of card contacts retained in the housing and divided into at least two groups to expose to corresponding card cavities; and at least one controlling member disposed on the housing between the two card cavities, and comprising a stopper deflected between the two car cavities and protruding into one card cavity once a card inserted into the other car cavity, and a resilient portion for urging the stopper to resume its original position once the card withdrew from the other cavity.

The detailed features of the present invention will be apparent in the detailed description with appropriate reference to the accompanying drawings.

DETAILED DESCRIPTION OF THE INVENTION

Figure 1:
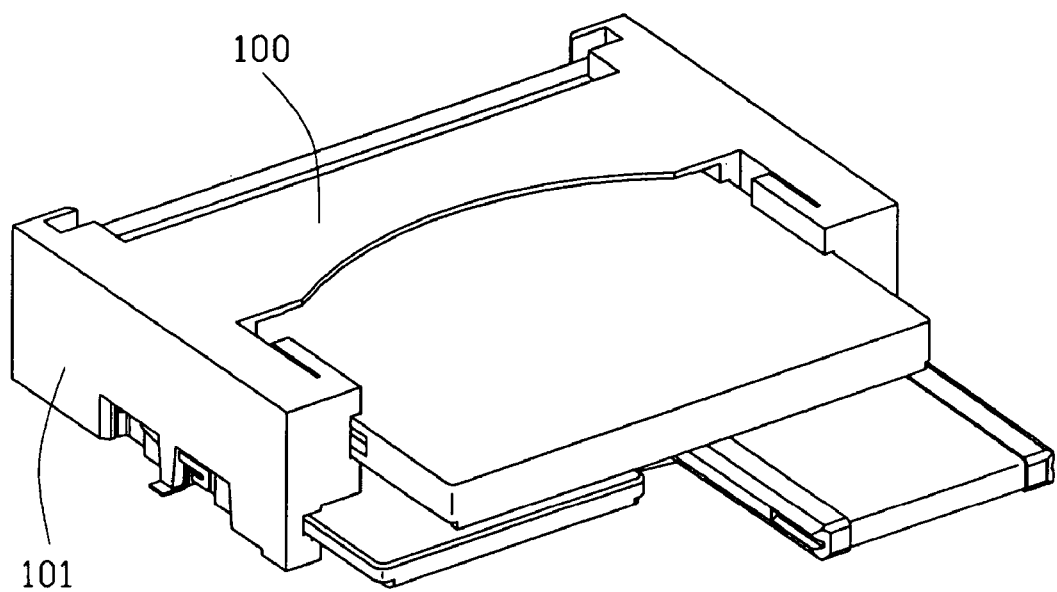
FIG. 1 is an assembled perspective view of a card connector and some cards in accordance with the present invention, without controlling members.

Referring to FIGS. 1 to 6, a card connector in accordance with the present invention is adapted for insertion of some different kinds of cards and only loads one card one time. The card connector comprises an insulative housing 1, CF card contacts 2, SD/MMC card contacts 3, MS card contacts 4, XD card contacts 5, a pair of first resilient members 6 and a second resilient member 7.

Figure 2:
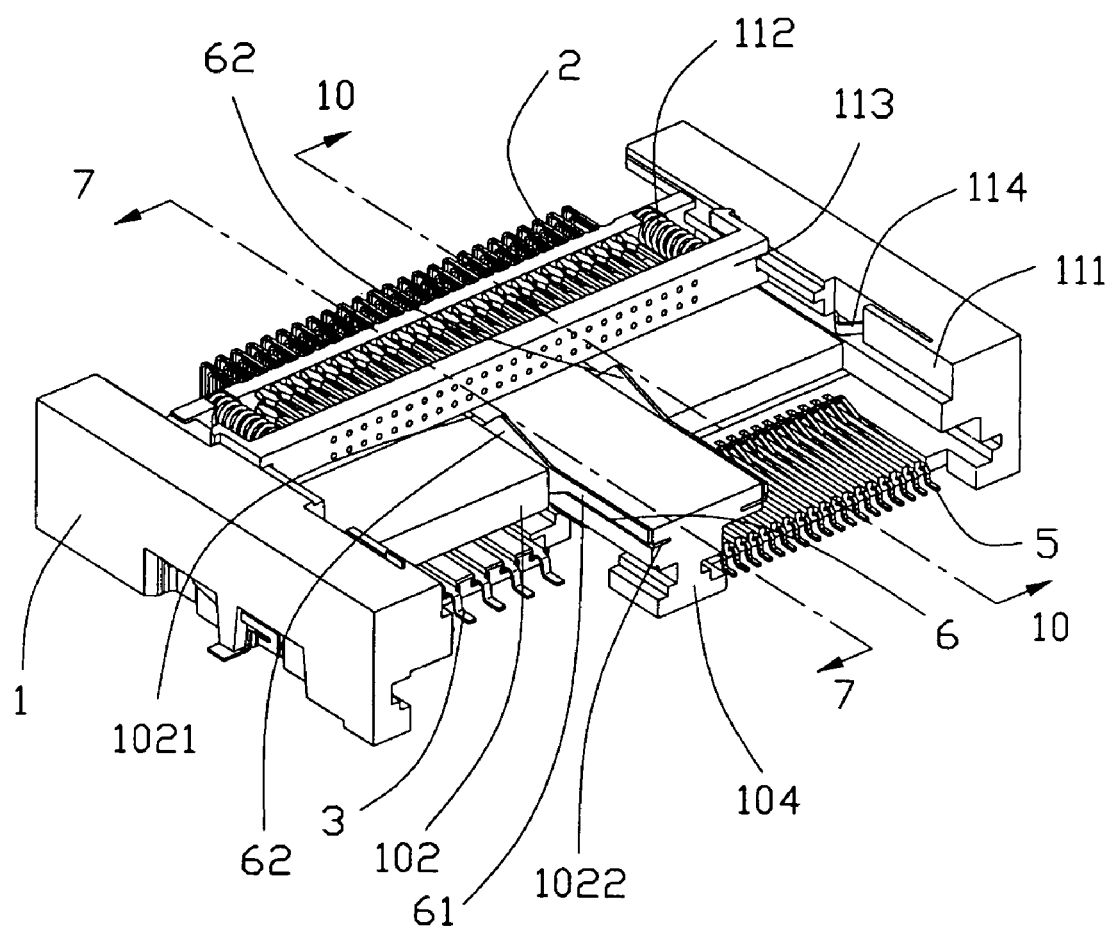
FIG. 2 is a perspective view of the card connector of FIG. 1, not showing a top plate of the card connector.
Figure 3:
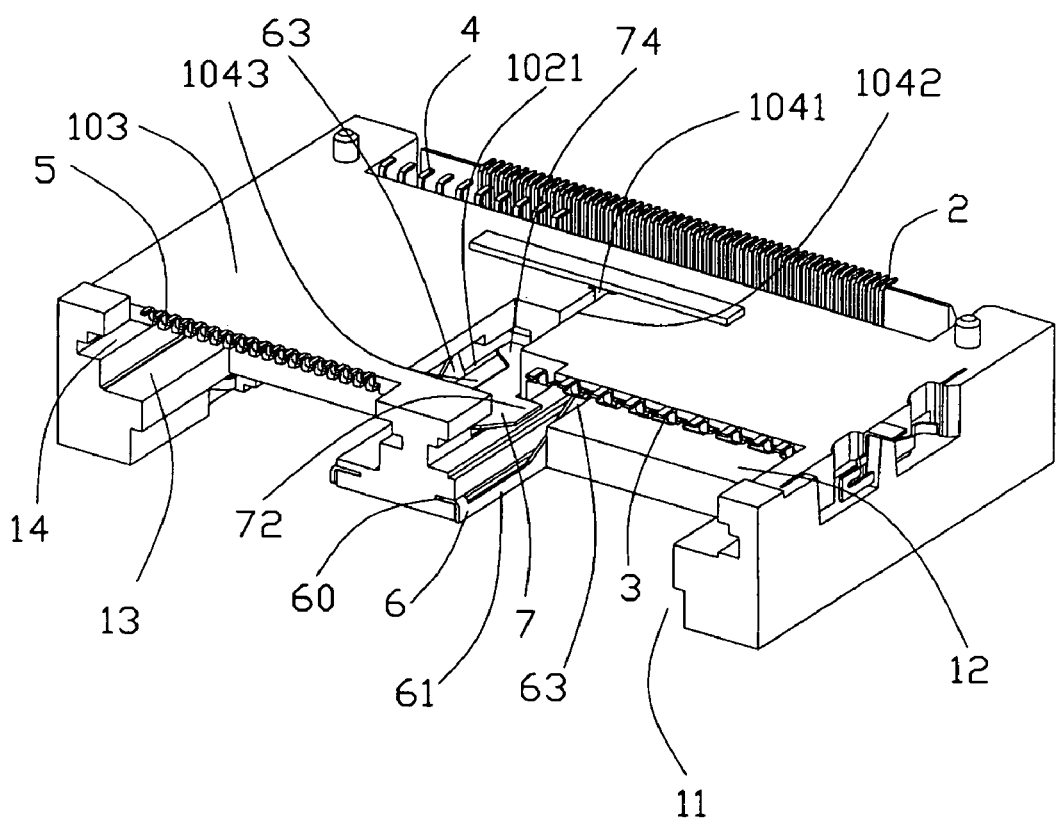
FIG. 3 is a perspective view of the card connector shown in FIG. 2, but taken from another aspect.
Figure 4:
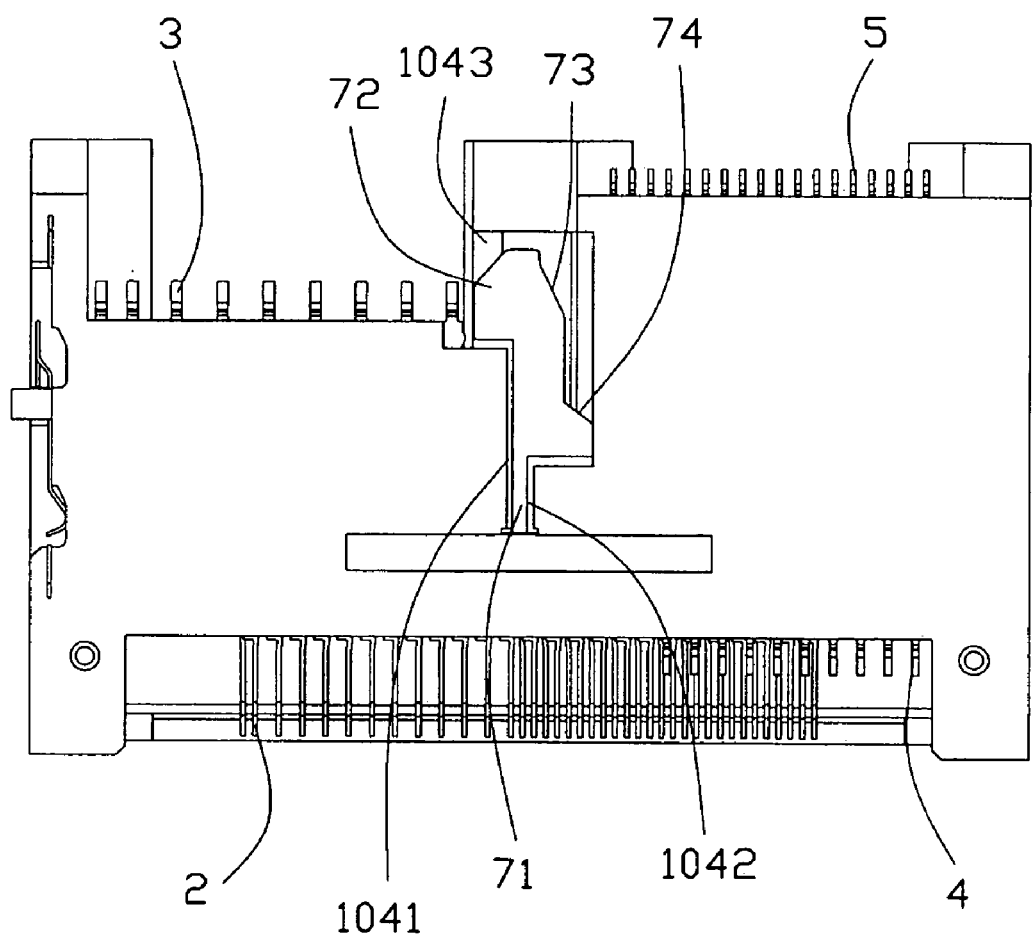
FIG. 4 is a bottom plane view of the card connector in accordance with the present invention.

Referring to FIGS. 1, 2 and 3, the insulative housing 1 of the card connector comprises a top plate 100, a pair of side plates 101, a middle plate 102 and a bottom plate 103. The housing 1 defines a CF card cavity 11 among the top plate 100, the middle plate 102 and upper side plates 111 of the side plates 101 for receiving the CF card, and defines a SD/MMC card cavity 12, a MS card cavity 13 and an XD card cavity 14 between the middle plate 102 and the bottom plate 103. The MS card cavity 13 and the XD card cavity 14 are located in a same space (not shown) and are in a position relation of upper and lower sides (referring to FIG. 3). The SD/MMC card cavity 12 is arranged side by side with the MS card cavity 13 and the XD card cavity 14. The housing 1 has a partition wall 104 between the SD/MMC card cavity 12 and the MS card cavity 13 and the XD card cavity 14 for separating the card cavity 12 with the card cavity 13 and the card cavity 14. The housing 1 is provided with a pair of springs 112 and a sliding block 113 disposed at laterals and front of the CF card contacts 2 separately and two locking contacts 114 are formed on front of the upper side plates 111 of the side plate 101. The CF card contacts 2 are located on end of the CF card cavity 11 along the CF card insertion direction and one end of the contacts 2 are received in holes of the sliding block 113. When the CF card inserted, the CF card moves along the upper side plates 111 and abuts against the sliding block 113 to electrically connect with the CF card contacts 2. The SD/MMC card contacts 3 are located on front of the SD/MMC card cavity 12. The MS card contacts 4 are located on end of the MS card cavity 13. The XD card contacts 5 are disposed on front of the XD card cavity 14.

Figure 5:
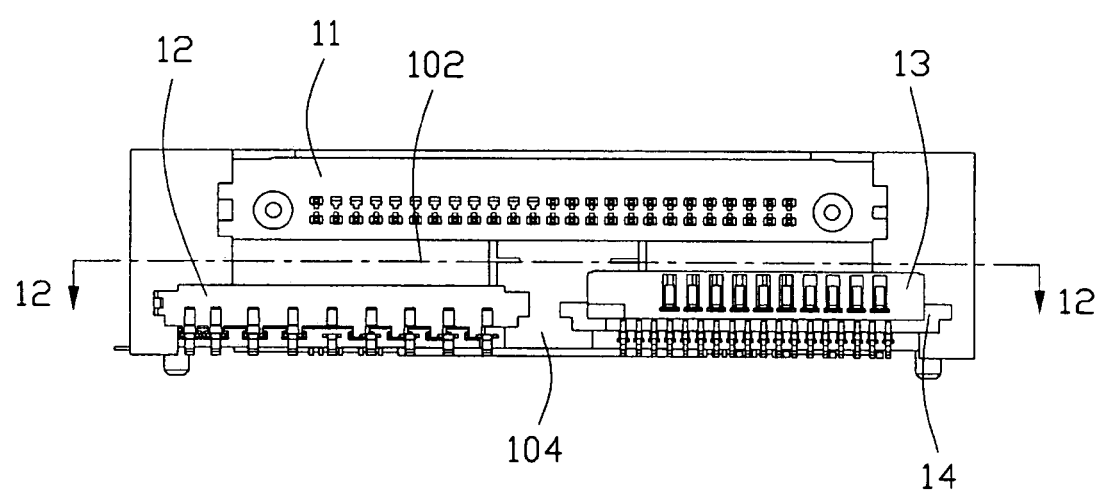
FIG. 5 is a front plane view of the card connector in accordance with the present invention.

Referring to FIG. 5, the MS card cavity 13 and the XD card cavity 14 are in the position relation of upper and lower sides and communicate each other, and the MS card cavity 13 and the XD card cavity 14 are overlapped partially. Thus when the MS card is inserted into the MS card cavity 13, the XD card can't be inserted into the XD card cavity 14 because the MS card occupies a part of the card cavity 14, and the MS card can't be inserted into the MS card cavity 13 also when the XD card is inserted into the XD card cavity 14.

Figure 6:
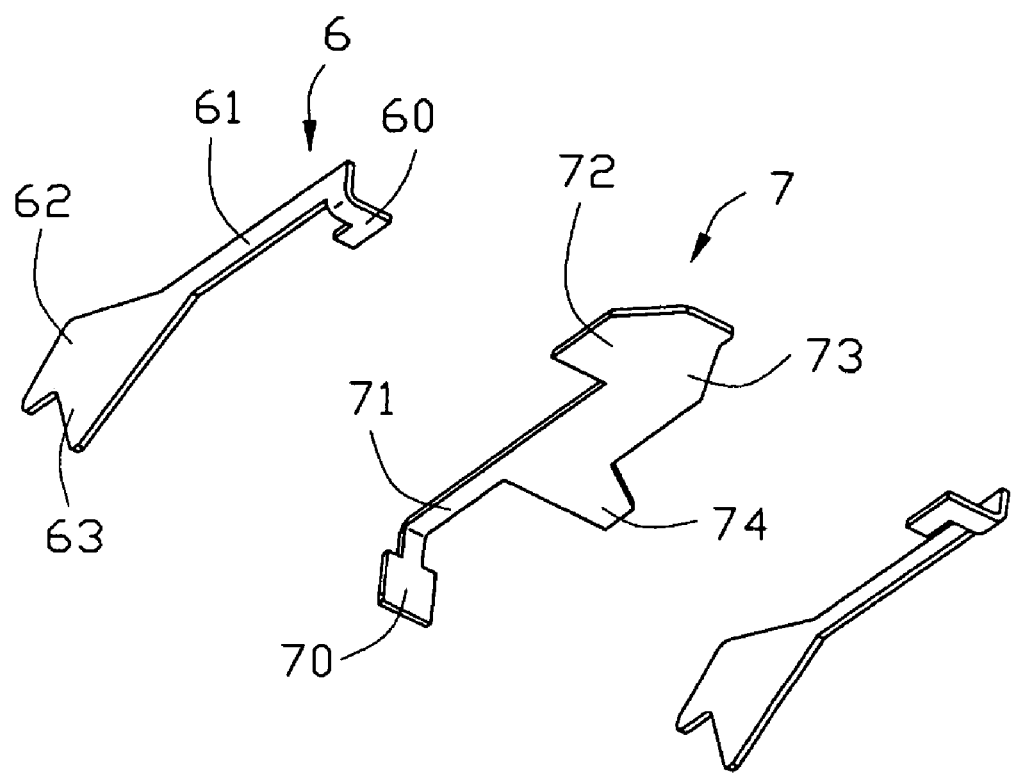
FIG. 6 is a perspective view of a first resilient member and a second resilient member of the card connector in accordance with the present invention.
Figure 7:
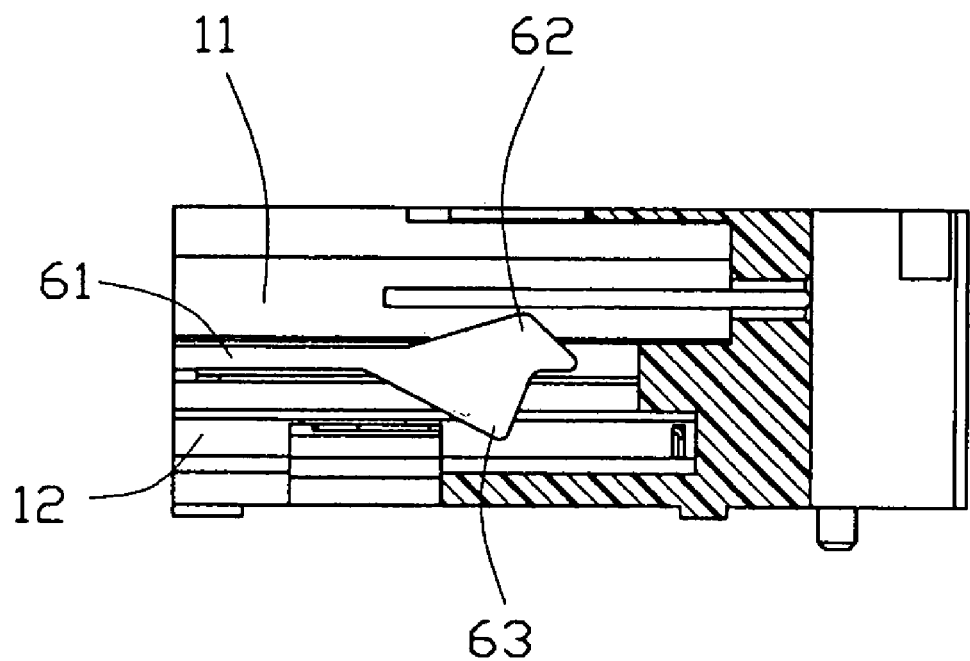
FIG. 7 is a cross-sectional view taken along line 7—7 of FIG. 2 of the card connector in accordance with the present invention.
Figure 8:
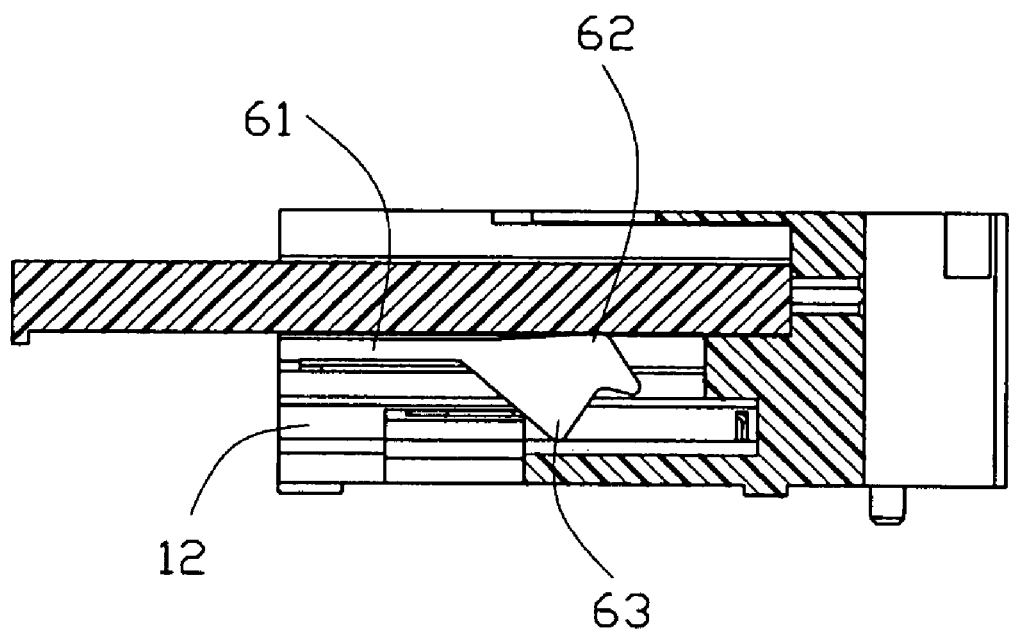
FIG. 8 is a cross-sectional view taken along the line 7—7 of FIG. 2 showing CF card being inserted into the card connector.
Figure 9:
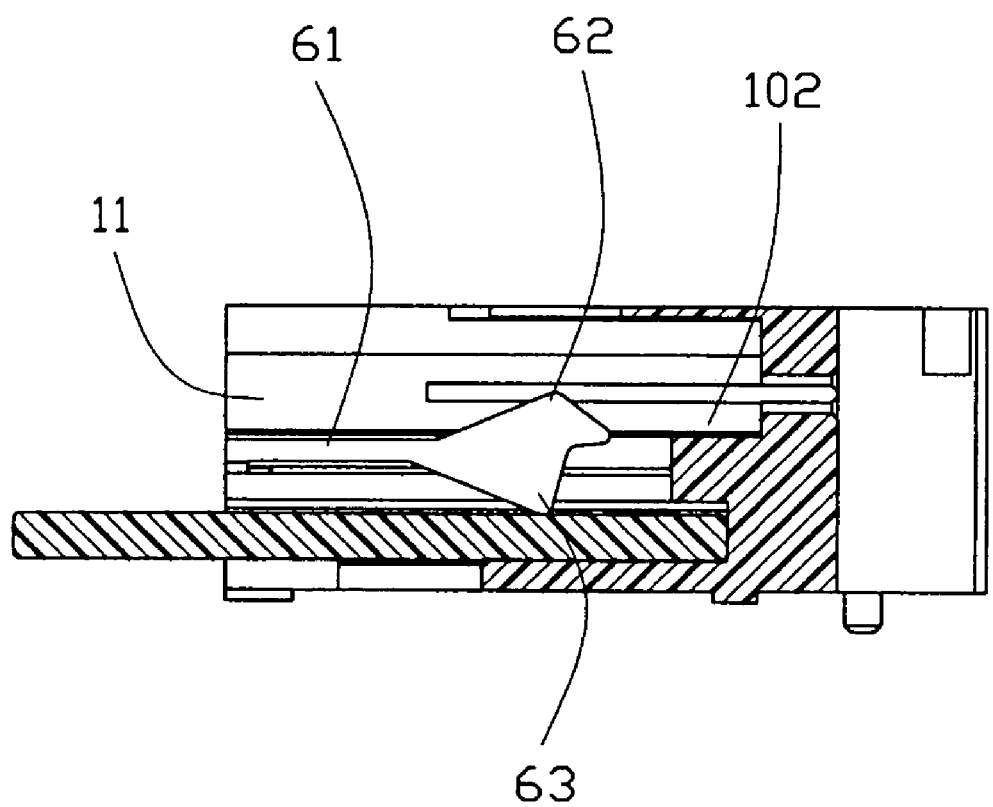
FIG. 9 is a cross-sectional view taken along the line 7—7 of FIG. 2 showing SD/MMC card being inserted into the card connector.
Figure 10:
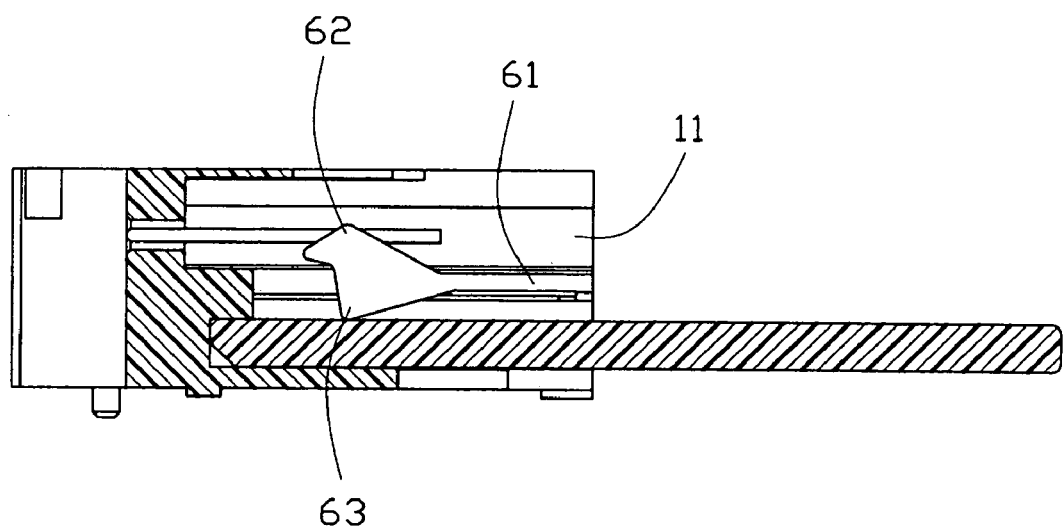
FIG. 10 is a cross-sectional view taken along line 10–10 of FIG. 2 showing MS card being inserted into the card connector.
Figure 11:
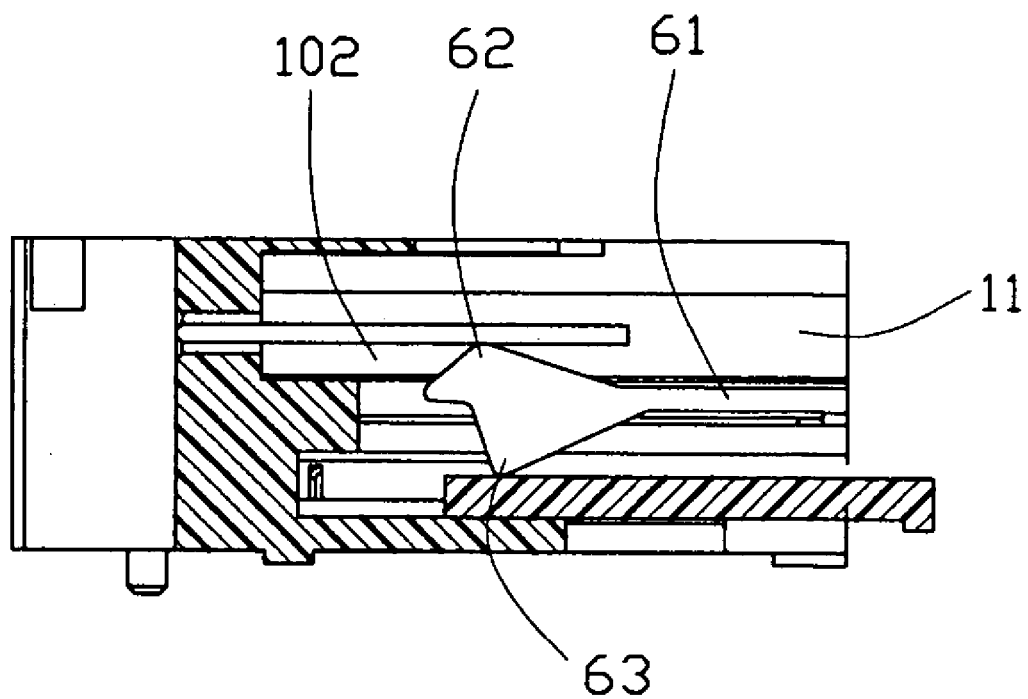
FIG. 11 is a cross-sectional view taken along the line 10—10 of FIG. 2 showing XD card being inserted into the card connector.

Referring to FIGS. 6 and 7, each of the first pair of resilient members 6 is of a sheet and comprises a securing portion 60, a resilient portion 61 extending perpendicularly from the securing portion 60 and a first stopper (not shown) formed at a free end of the resilient potion 61. The stopper comprises an upper protrusion 62 and a lower protrusion 63 on its opposite two sides. The upper protrusion 62 and the lower protrusion 63 are both approximately triangular. In conjunction with FIG. 2, the housing 1 defines a pair of grooves 1021 through the middle plate 102 adjacent to two laterals (not shown) of the partition wall 104. A pair of locking slots 1022 are formed on fronts of the two laterals of the partition wall 104. The securing portion 60 is secured in the locking slot 1022, the resilient portion 61 is abutted against the lateral of the partition wall 104 and the first stopper with the upper protrusion 62 and the lower protrusion 63 is disposed in the groove 1021. In conjunction with FIG. 8, when the CF card is inserted into the CF card cavity 11, the CF card will engage with the upper protrusions 62 and press the upper protrusions 62 downwardly along the corresponding grooves 1021, thus the lower protrusions 63 will move downwardly along movement of the upper protrusions 62 and finally expose in the SD/MMC card cavity 12 and the MS card cavity 13 and the XD card cavity 14 separately in virtue of elastic distortion of the resilient portion 61. At this rate, the lower protrusion 63 blocks off insertion of the SD/MMC card, the MS card or the XD card. The SD/MMC card, the MS card or the XD card can't be inserted into the corresponding card cavity unless the CF card is drawn out from the CF card cavity 11. In conjunction with FIGS. 9, 10 and 11, when the SD/MMC card, the MS card or the XD card is inserted into the corresponding card cavity, it will press the lower protrusion 63 upwardly and finally make the upper protrusion 62 expose in the CF card cavity 11, thus the upper protrusion 62 blocks off insertion of the CF card and the CF card can't be inserted into the CF card cavity 11 unless the SD/MMC card, the MS card or the XD card is drawn out from the corresponding card cavity.

Figure 12:
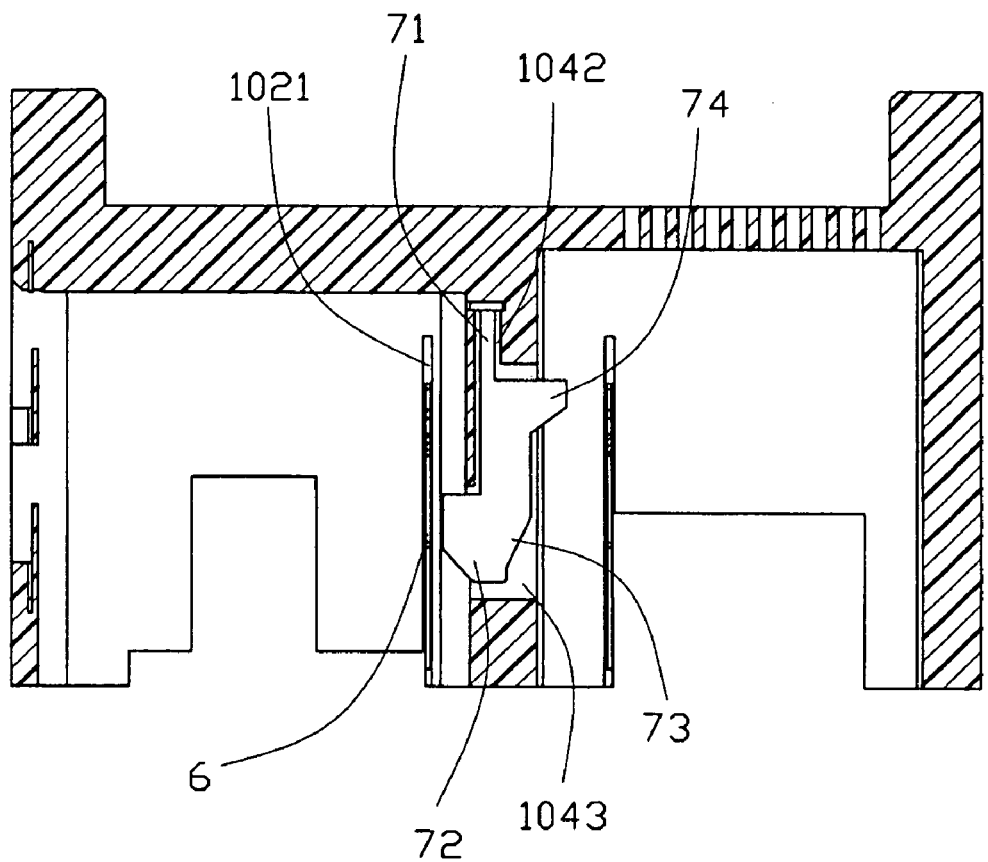
FIG. 12 is a cross-sectional view taken along line 12—12 of FIG. 5 of the card connector in accordance with the present invention.
Figure 13:
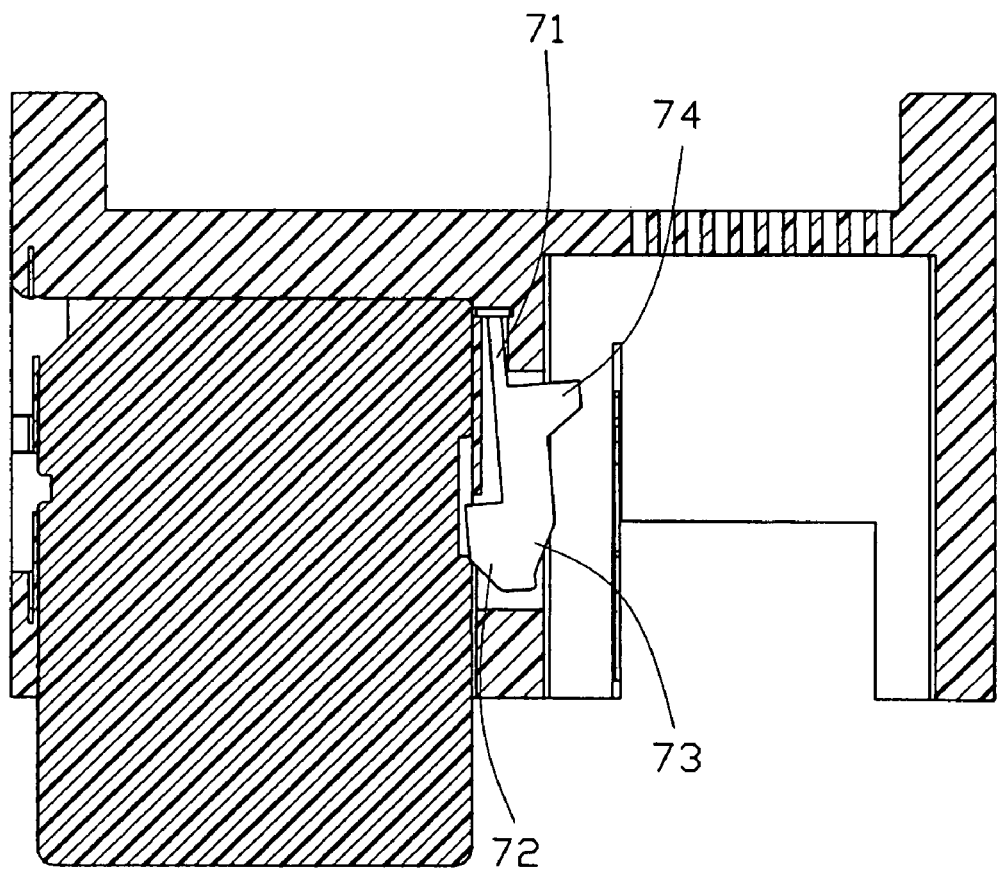
FIG. 13 is a cross-sectional view taken along the line 12—12 of FIG. 5 showing SD/MMC card being inserted into the card connector.
Figure 14:
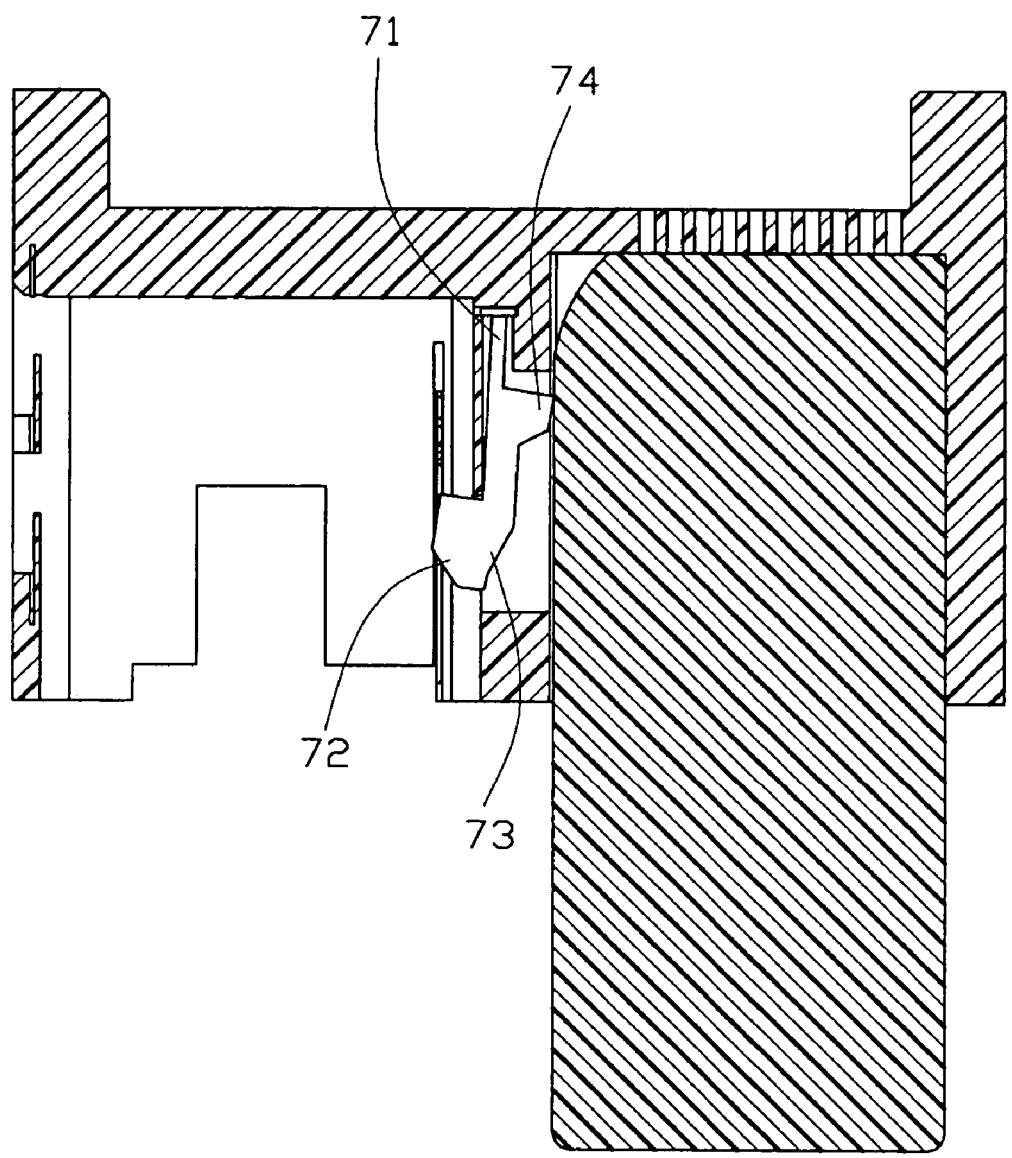
FIG. 14 is a cross-sectional view taken along line 12—12 of FIG. 5 showing MS card being inserted into the card connector.
Figure 15:
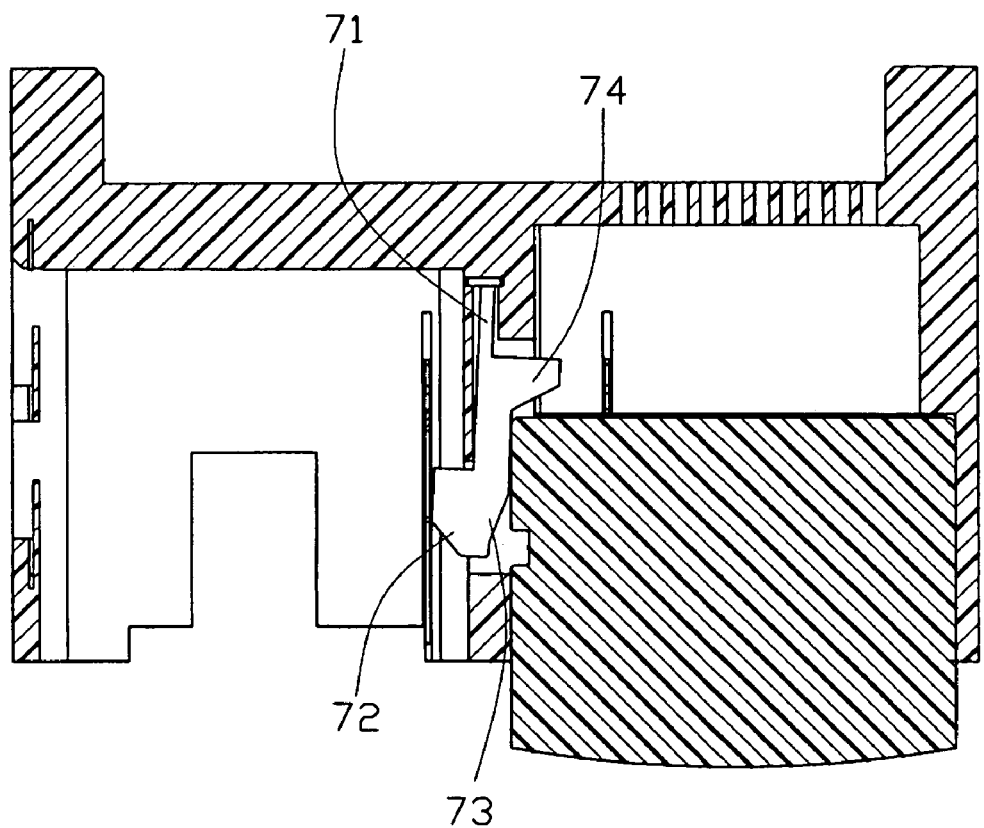
FIG. 15 is a cross-sectional view taken along line 12—12 of FIG. 5 showing XD card being inserted into the card connector.

Referring to FIG. 6, the second resilient member 7 is of a sheet and comprises a securing portion 70, a resilient portion 71 extending perpendicularly from the securing portion 70 and a second stopper (not shown) formed at a free end of the resilient potion 71. The second stopper comprises a first protrusion 72 protruding from one side of free end thereof, a second protrusion 73 protruding from another side of the free end thereof and a third protrusion 74 protruding from thereon and formed behind the second protrusion 73. The first, second and third protrusions 72, 73 and 74 are all approximately echelon and distance of the third protrusion 74 protruding from the second stopper is longer than that of the second protrusion 73. In conjunction with FIGS. 3, 4 and 12, the partition wall 104 defines a securing slot 1041 adjacent to end of the housing 1, a rectangular slot 1042 extending forwardly from the securing slot 1041 along card detachment direction and an aperture 1043 extending from the rectangular slot 1042 along card detachment direction. A part of the SD/MMC card cavity 12 communicates with a part of the space (not shown) composed by the MS card cavity 13 and the XD card cavity 14 because of the aperture 1043. The securing portion 70 of the second resilient member 7 is securing into the securing slot 1041, the resilient portion 71 is abutting against the rectangular slot 1042 parallel and width of the rectangular slot 1042 is wider than that of the resilient portion 71 and the second stopper with the protrusions 72, 73 and 74 of the second resilient member 7 is disposed in the aperture 1043. The first protrusion 72 protrudes into the SD/MMC card cavity 12 partly and the second protrusion 73 and the third protrusion 74 protrude into the mutual part of the MS card cavity 13 and the XD card cavity 14. In conjunction with FIGS. 13, 14 and 15, when SD/MMC card is inserted into the SD/MMC card cavity 12, the SD/MMC card will press the first protrusion 72 into the aperture 1043 and make the resilient portion 71 distort elastically, thus the second protrusion 73 and the third protrusion 74 are pressed into the MS card cavity 13 and the XD card cavity 14. At this rate, the second protrusion 73 or the third protrusion 74 blocks off insertion of the XD card or the MS card respectively, the MS card or the XD card can't be inserted into the corresponding card cavity unless the SD/MMC card is drawn out from SD/MMC card cavity 12. Because the MS card and the XD card are different in outer shape, the MS card will engage with the third protrusion 74 of the second resilient member 7 and the XD card will engage with the second protrusion 73 when the MS card or the XD card is inserted into corresponding card cavity separately. Finally, the MS card or the XD card will press the third protrusion 74 or the second protrusion 73 into the aperture 1043 and make the first protrusion 72 protrude into the SD/MMC card cavity 12 and block off insertion of the SD/MMC card. The SD/MMC card can't be inserted into the SD/MMC card cavity 12 unless the MS card or the XD card is drawn out from the corresponding card cavity.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A card connector, comprising:
an insulating housing defining at least two adjacent card cavities;
a plurality of card contacts retained in the housing and divided into at least two groups to expose to corresponding card cavities; and
at least one controlling member disposed on the housing between the two card cavities, and comprising a stepper deflected between the two card cavities and protruding into one card cavity once a card inserted into the other card cavity, and a resilient portion extending from the stopper for urging the stopper to resume its original position once the card withdrew from the other cavity.

2. The card connector as described in claim 1, wherein the stopper is formed at a free end of the resilient portion, and wherein an end opposite to the free end of the resilient portion are securely mounted on the housing.

3. The card connector as described in claim 1, wherein the stopper partially protrudes into at least one cavity in its original position.

4. The card connector as described in claim 1, wherein the card cavities are arranged side by side and the housing comprises a partition wall between the card cavities, the resilient portion of the controlling member is disposed in a rectangular slot formed on the partition wall and the stopper is disposed in an aperture formed on the partition wall and communicating with the card cavities.

5. The card connector as described in claim 1, wherein the housing comprises at least three card cavities and two of the card cavities are in a position relation of upper and lower sides and overlapped partially each other.

6. The card connector as described in claim 1, wherein the stopper comprises three protrusions and the protrusions are echelon.

7. The card connector as described in claim 6, wherein two of the three protrusions are formed on one side of the stopper and distance of the protrusion adjacent to the resilient portion protruding from the stopper is longer than that of another protrusion of the two protrusions.

8. The card connector as described in claim 1, wherein the stopper has a pair of protrusions protruding into the corresponding cavities in its original position.

9. The card connector as described in claim 8, wherein the pair of protrusions are approximately triangular for the cards being inserted into the corresponding card cavities conveniently.

10. The card connector as described in claim 8, wherein the card cavities are in a position relation of upper and lower sides and the housing comprises a, middle plate between the card cavities, the stopper of the controlling member are disposed in a groove of the middle plate.

11. A card connector, comprising:
   an insulating housing defining neighboring first and second card cavities horizontally arranged side by side for receiving first and second type cards, respectively;
   a plurality of card contacts retained in the housing and divided into two groups to expose to the corresponding first and second card cavities, respectively; and
   at least one controlling member disposed on the housing between the first and second card cavities, and comprising a stopper deflectably movable relative to the first and second card cavities; wherein the stopper is urged to an original position by a resilient device when no first type and second type cards are respectively received in the corresponding first and second card cavities, and protrudes into the first card cavity to prevent insertion of the first type card into the first card cavity when the second type card is inserted into the second card cavity.

12. The card connector as claimed in claim 11, wherein said stopper protrudes into the second card cavity to prevent insertion of the second type card into the second card cavity when the first type card is in advance inserted into the first card cavity.

13. The card connector as claimed in claim 11, wherein said controlling member is formed by a thin sheet of metal.

14. The card connector as claimed in claim 11, said housing further defines a third card cavity adjacent to one of said first and second card cavities for receiving a third type card, and defines another controlling member located between said third card cavity and said one of said first and second card cavities for mutually exclusive insertion of either said third type card or the corresponding one of said first and second type cards, into the corresponding third card cavity or said one of said first and second card cavities.

15. The card connector as claimed in claim 14, wherein the controlling member is deflected in a first direction, and said another controlling member is deflected in a second direction in a non-parallel relation with said first direction.

16. A card connector. comprising:
   an insulating housing defining first, second and third card cavities neighboring with one another for receiving first, second and third type cards, respectively;
   a plurality of card contacts retained in the housing and divided into three groups to expose to the corresponding first, second and third card cavities, respectively;
   a first controlling member disposed on the housing between the first and second card cavities, and comprising a stopper deflectably movable relative to the first and second card cavities for mutually exclusive insertion of one of said first and second type cards into the corresponding one of said first and second card cavities during operation; and
   a second controlling member disposed on the housing and between the third card cavity and said corresponding one of the first and second card cavities for mutually exclusive insertion of one of said third type card and said one of the first and second type cards into the corresponding one of said third cavity and said one of the first and second card cavities.

17. The card connector as claimed in claim 16, wherein the first controlling member is deflected in a first direction, and the second controlling member is deflected in a second direction in a non-parallel relation with the first direction.

18. The card connector as claimed in claim 16, wherein the first cavity and the second cavity are side by side arranged with each other in a horizontal direction while the third cavity and said one of the first and second card cavities is arranged in a stacked manner along a vertical direction perpendicular to said horizontal direction.

19. The card connector as claimed in claim 18, wherein at least one of said first and second controlling members is deflectably moveable relative to the corresponding two neighboring cavities via a spring device.

20. The card connector as claimed in claim 18, wherein said first and second controlling members are closely positioned with each other for saving space.

* * * * *